W. OLIVER.
Mechanical Movements.
No. 142,578. Patented September 9, 1873.
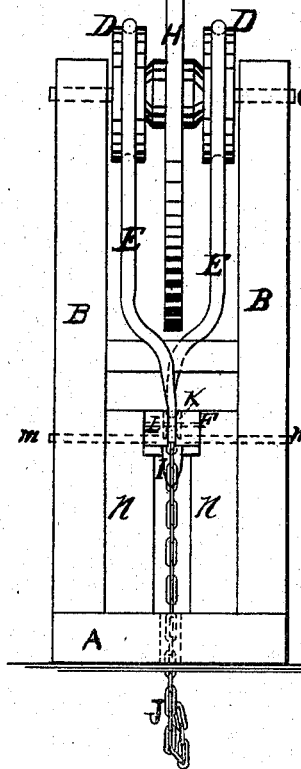
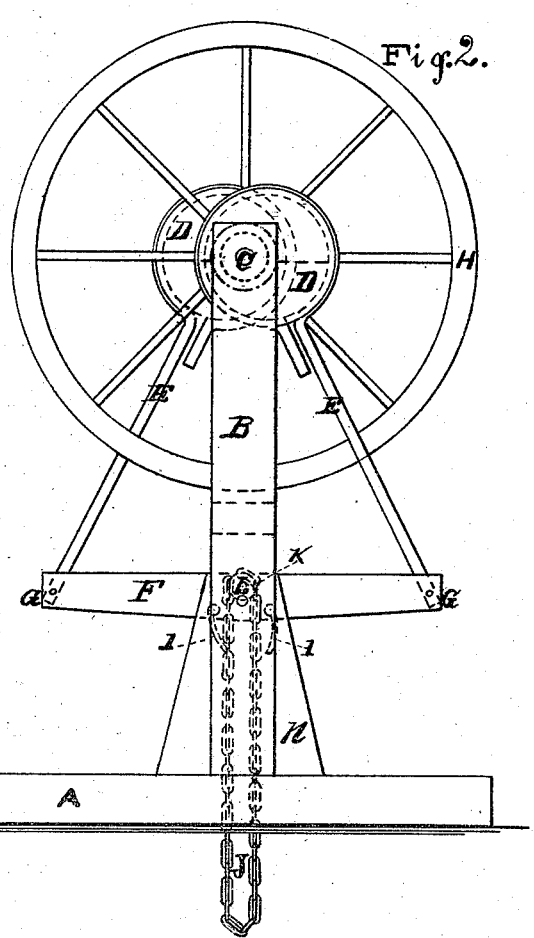

UNITED STATES PATENT OFFICE.

WILLIAM OLIVER, OF HAYNESVILLE, LOUISIANA.

IMPROVEMENT IN MECHANICAL MOVEMENTS.

Specification forming part of Letters Patent No. 142,578, dated September 9, 1873; application filed July 21, 1873.

*To all whom it may concern:*

Be it known that I, WILLIAM OLIVER, of Haynesville, in the parish of Claiborne and State of Louisiana, have invented a new Mechanical Movement; and I do hereby declare the following description and accompanying drawing are sufficient to enable any person skilled in the art or science to which it most nearly appertains to make and use my said invention or improvement without further invention or experiment.

The object of my invention is to provide an improvement in mechanical movements that are applicable to hoisting-machines of various kinds, and to other purposes; and it consists in a novel mechanism for rocking a lever to which pawls are attached, so that their ends, as the lever rocks, may engage with and move an endless chain.

Referring to the accompanying drawing for a more complete explanation of my invention, Figure 1 is a front elevation of my movement, and Fig. 2 is a side view of the same.

A is the base, to which are secured uprights B B. C is a shaft, to which are attached eccentrics D D. These eccentrics are set directly opposite, and are provided with straps E, that connect with the ends of lever F at G G. The shaft C is turned by means of a band passing around wheel H, which, as the eccentrics revolve, causes the lever F to rock, and the pawls I I to alternately catch in the links of the chain J. This chain passes up through said lever and over pulley K, which turns loosely upon pin L. The pins M M hold the lever in place, and the pieces N N brace the uprights B B.

In place of the endless chain J, a rack with teeth upon each side may be substituted, and the pawls worked the same as if the chain was used.

Having thus described my invention, what I claim as new, and desire to secure by Letters Patent, is—

A mechanical movement consisting of the eccentrics D D, straps E E, lever F, pawls I I, and chain J, when the same are combined and arranged to operate as and for the purposes described.

WILLIAM OLIVER.

Witnesses:
SYDNEY BROOKS,
Z. P. DEDRICK.